United States Patent
Banerjee et al.

(10) Patent No.: US 8,732,267 B2
(45) Date of Patent: May 20, 2014

(54) PLACEMENT OF A CLOUD SERVICE USING NETWORK TOPOLOGY AND INFRASTRUCTURE PERFORMANCE

(75) Inventors: Subrata Banerjee, Los Altos, CA (US); Sukhdev S. Kapur, Saratoga, CA (US); Joshua Merrill, Parker, CO (US); Ashok Ganesan, San Jose, CA (US); Debojyoti Dutta, Santa Clara, CA (US); Huida Dai, Cupertino, CA (US); Arpan K. Ghosh, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 13/048,645

(22) Filed: Mar. 15, 2011

(65) Prior Publication Data

US 2012/0239792 A1 Sep. 20, 2012

(51) Int. Cl.
*G06F 15/16* (2006.01)
(52) U.S. Cl.
USPC .......................................................... 709/217
(58) Field of Classification Search
USPC .................................................. 709/217, 223
See application file for complete search history.

(56) References Cited

U.S. PATENT DOCUMENTS

| | | | |
|---|---|---|---|
| 2010/0218103 A1* | 8/2010 | Nedelcu et al. | 715/735 |
| 2010/0223385 A1* | 9/2010 | Gulley et al. | 709/226 |
| 2010/0324751 A1* | 12/2010 | Nagpal et al. | 700/300 |
| 2010/0332262 A1* | 12/2010 | Horvitz et al. | 705/4 |
| 2011/0161952 A1* | 6/2011 | Poddar et al. | 717/173 |
| 2011/0282975 A1* | 11/2011 | Carter | 709/220 |
| 2012/0057191 A1* | 3/2012 | Gnanasambandam et al. | 358/1.15 |
| 2012/0203888 A1* | 8/2012 | Balakrishnan et al. | 709/224 |

* cited by examiner

*Primary Examiner* — Jason Recek
(74) *Attorney, Agent, or Firm* — Patterson & Sheridan, LLP

(57) ABSTRACT

Techniques are described for selecting an optimal data center for instantiating a first cloud service. Embodiments of the invention receive a request specifying a topology of a first cloud service to be hosted by one of a plurality of data centers which provide computing resources to host a plurality of cloud services. A suitability value is then determined for each of the data centers which measures a fitness of the data center for instantiating the first cloud service. In one embodiment, the suitability value is determined by calculating a plurality of metric values for the data center, normalizing the metric values and calculating a weighted average of the normalized values. One of the data centers is then selected for instantiating the first cloud service, based at least in part on the determined suitability values.

18 Claims, 7 Drawing Sheets

US 8,732,267 B2

PLACEMENT OF A CLOUD SERVICE USING NETWORK TOPOLOGY AND INFRASTRUCTURE PERFORMANCE

TECHNICAL FIELD

Embodiments presented in this disclosure generally relate to providing access to cloud resources, and more particularly, to identifying an optimal location within a cloud for instantiating a new cloud service.

BACKGROUND

Cloud computing has become a popular approach for obtaining access to (sometimes large-scale) computing resources. Cloud computing allows users to build virtualized data centers which include compute, networking, application, and storage resources without having to build or maintain a physical computing infrastructure. The virtualized data center may provide a user with a segmented virtual network located in the cloud, typically alongside virtualized data centers of other users. Such a virtualized data center may be rapidly scaled up (or down) according to the computing needs of a given user without the need to maintain excess computing capacity between peak demand periods. For example, an online retailer can scale a virtualized data center to meet increased demand during the holiday shopping season without having to maintain the underlying physical computing infrastructure used to provide the retailer's online presence.

Often times, a cloud computing environment is created using multiple data centers, with each data center providing various computing resources to the cloud. Such data centers are frequently located in different geographical locations. Furthermore, the resources that each data center provides to the cloud may differ. For example, a first data center may provide higher performance computing resources than a second data center, or may provide fast network access to particular computing resources that are not provided at all by the second data center. Additionally, the workloads of the computing resources provided by each of the data centers may differ as well. For instance, while the computing resources of the first data center may be operating at 90% capacity, the computing resources of the second data center may only be operating at 20% capacity.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1A:
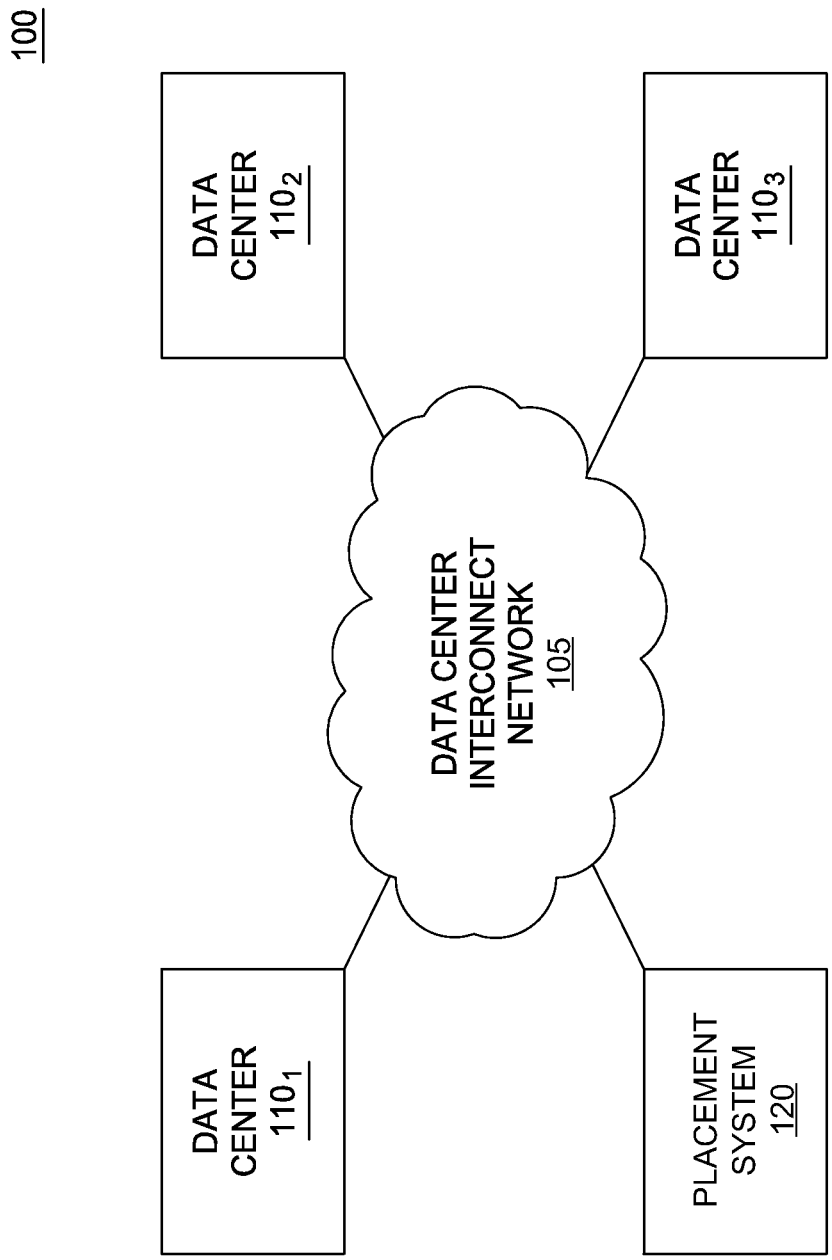
FIGS. 1A-1B illustrate systems for fulfilling resource requests, according to embodiments of the present invention.

Embodiments of the invention provide a method including receiving a request specifying a topology for a first cloud service to be hosted by one of a plurality of data centers which provide computing resources for hosting a plurality of cloud services. The topology includes resource requirements and connectivity requirements for the first cloud service. The method further includes, for each data center in the plurality of data centers, determining a suitability value which describes a fitness of the respective data center for hosting the first cloud service having the specified topology. Additionally, the method includes selecting, from at least two of the plurality of data centers capable of hosting the first cloud service, one of the data centers to fulfill the request, based at least in part on the determined suitability values.

Additional embodiments include a system having a processor and a memory storing a program configured to perform the aforementioned method, and software embodied in a computer readable medium storing a program configured to perform the aforementioned method.

Description of Example Embodiments

Generally, embodiments of the invention pertain to clouds of computing resources which are hosted using a plurality of multi-tenant data centers. As defined herein, the term "computing resources" is generally refers to any computer-related resources, examples of which include, without limitation, processing resources, storage resources, network resources and software resources. The term "data center" is defined herein as any location which may host cloud services and which provides computing resources to the cloud. Embodiments described herein provide a method for identifying an optimal data center within the cloud for the provisioning of a virtualized data center for an end user. Each virtualized data center provides services such as load balancing, firewall, multi-VLANs (sub-container's), MPLS VPN services, delivered to users as a complete end-to-end service.

Embodiments described herein may be provided to end users through a cloud computing infrastructure. Cloud computing generally refers to the provision of segmented hardware and software resources as a service delivered over a network. More formally, cloud computing may provide an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can typically access any of the resources that reside in the cloud at any time, and from anywhere across the Internet. In context of the present disclosure, users may submit a request to a cloud service for a virtualized data center (which hereinafter may be referred to as "vDC") or a Cloud Network Container. As described in greater detail below, a placement system may identify a plurality of data centers, each of which provides computing resources for the cloud, and may determine which of the identified data centers is best suited for fulfilling the received request. The placement system may then transmit the received cloud resource request to the data center determined to be best suited for fulfilling the request.

In determining which data center is best suited for fulfilling the request, the placement system may calculate a suitability value for each of the identified data centers. Generally, the suitability value indicates the fitness of the data center for processing (and hosting) a specific cloud resource request. In one embodiment, the suitability value for a particular data center may be calculated by first calculating a plurality of metrics for the data center. Such metrics may include, for example, a geographical proximity from the data center to the user's site, a network proximity (e.g., a number of hops) from the data center to the user's site, the performance of the network between the data center and the user's site, and so on. The placement system may then use the calculated metrics to calculate the suitability value for the data center. For instance, in one embodiment, the placement system 120 may normalize the metric values and then calculate a weighted average of the normalized values to produce the suitability value for the data center.

In the following, reference is made to embodiments of the present invention. However, it should be understood that the present disclosure is not limited to specific described embodiments. Instead, any combination of the following features and elements, whether related to different embodiments or not, is contemplated to implement and practice the present disclosure, and moreover the disclosure is to be accorded the widest scope consistent with the principles and features described herein. Furthermore, although embodiments of the invention may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
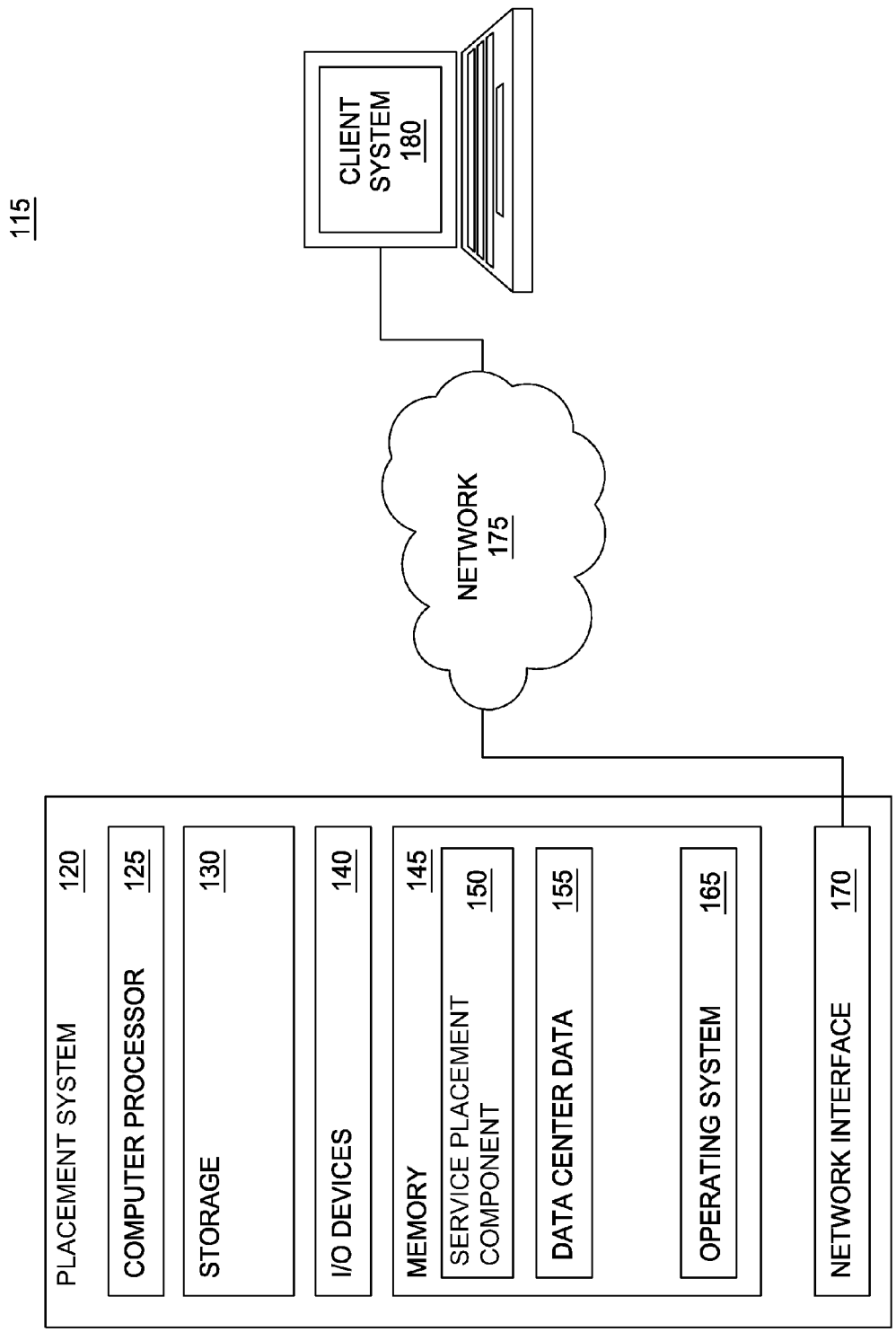

FIGS. 1A-1B illustrate systems for fulfilling cloud resource requests, according to embodiments of the present invention. FIG. 1A illustrates an example physical data center infrastructure used to host virtualized data centers, according to one embodiment of the present invention. As shown, the computing infrastructure 100 includes a plurality of data centers 110 and a placement system 120, each connected to a data center interconnect network 105. Each data center 110 provides the physical computing infrastructure which may be used to provide cloud-based, virtualized data centers and network containers to customers upon request. As such, each data center 110 may provide server computing systems (e.g., blade systems or other rack mounted server computers), software, network devices (e.g., routing and switching devices), and storage systems (e.g., NAS, SAN storage devices), along with the appropriate cabling, cooling, and power systems, used to provide cloud computing services.

Illustratively, a user may submit a request specifying a particular logical topology for a virtualized data center. Such a request may include a number of computer systems to include in the virtualized data center, and may further specify a configuration and connectivity of the computer systems. For instance, an example cloud service topology included in a request may specify three logical computer systems (or virtual machines) that are interconnected, with a firewall on the connection between the first two computer systems, and a load balancer on the connection between the second two computer systems. A portion of the resources of a data center 110 may then be allocated to create the virtualized data center in order to fulfill the request and to provide the user with complete logical segmentation on the shared computing infrastructure 100.

In one embodiment, the virtual data center may host a collection of instances of virtual machines. As is known, a virtual machine generally provides a virtualized computing environment (typically, a virtual processor, memory, and storage) on which a guest operating system and associated application software can run. Multiple virtual machines can operate on the same host machine concurrently. Of note, often times a particular request will be fulfilled using the resources of a single data center, so as to minimize the latency between allocated computing resources and to consolidate the resources used to create the virtualized data center. Thus, for example, in fulfilling a request from a user for a virtualized data center containing ten virtual machines, the virtual machines may all be allocated from the same data center 110 so as to minimize the latency between the virtual machines.

In one embodiment, users launch virtual machines and run them inside one of their virtualized data centers. Thus, the virtualized data center provides an environment that a user can scale up (or down) on demand. For example, an online retailer may create a virtualized data center used to host a number of web servers, application servers, and database servers. Such a virtualized data center could include a front-end access point, a virtualized firewall and load balancer used to distribute web-page requests to a pool of web servers running on virtual machines. Such a group of virtual machines may be part of a common network segment associated with the online retailer's network container on the computing infrastructure. As demand increases (e.g., during the holiday shopping season) the retailer can spawn additional virtual machines to handle this peak demand period. Following such a demand period, the additional virtual machines can be shut down and the resources used to provide those virtual machines can be returned to the shared resource pool provided by the computing infrastructure 100.

The placement system 120 is generally a computer system with software components used to assign received user requests to a particular data center 110. The placement system 120 may receive a user request specifying a topology for a virtualized data center and may calculate a suitability value for each of the data centers 110 for processing the request. The placement system 120 may generally consider each data center's capability to satisfy the received request. For instance, if the request specifies that the virtualized data center should include at least one load balancer, the placement system 120 may only consider data centers 110 capable of providing load balancing functionality.

The suitability value may also be based upon factors such as the geographic proximity of the data center 110 to the user's location, the network proximity of the data center 110 to the user's location (e.g., a number of hops between the two), and network performance between the data center 110 and the user's location (e.g., latency, loss, etc.). Additionally, the placement system 120 may consider the current workload of the data centers 110 in calculating the suitability value. Thus, for example, if the data center $110_1$ is operating at 90% capacity and the data center $110_2$ is operating at 10% capacity, the placement system 120 may give a preference (e.g., by way of a higher suitability value) to the data center $110_2$ in order to balance the workload between all the data centers 110.

Once the suitability value is calculated for each of the data centers 110, the placement system 120 may select one data center 110 for fulfilling the request based on the calculated suitability values. The placement system 120 may then transmit the request to the selected data center 110. Advantageously, by doing this, embodiments of the invention may intelligently select an optimal data center 110 for processing a given request. This, in turn, may improve the performance of the virtualized data center instantiated based on the request, and may better balance the workload and other desirable operating conditions between the data centers 110.

The placement system 120 may also consider one or more policy constraints in selecting a data center 110 for fulfilling the request. In one embodiment, the policy constraints may be included in the request, and each policy constraint may include a conditional expression identifying a set of data centers. Generally, the policy constraints may be specified by the user submitting the request to restrict the range of data centers the placement system 120 considers for instantiating the new cloud service. As an example, a request may include a topology for a virtualized data center for use in running a particular type of software application, for which special legal considerations apply in certain states. In such an example, a user may include a policy constraint in the request, indicating that the virtualized data center should be placed within a particular state's geographical boundaries, due to legal requirements in the state regarding backup data for that type of application. In such an example, the placement system 120 may determine that only data centers 110 located in within the specified state should be considered for fulfilling the received request. As a second example, in other scenarios, the placement system 120 may exclude certain states or geographical locations from consideration based on a policy constraint. In some cases, it may be appropriate for the placement system 120 to give a preference to data centers 110 in particular geographic locations based on one or more policy constraints.

According to one embodiment, the placement system 120 may calculate a plurality of metrics for each of the data centers 110. As discussed above, examples of such metrics include geographical proximity, network proximity, network performance, capability to fulfill the request, and resource availability to support the new cloud service's workload. Once the plurality of metrics is calculated, the placement system 120 may normalize the metrics, and may then calculate a single suitability value from the normalized metrics. In one embodiment, the placement system 120 calculates the suitability value by calculating a weighted average of the normalized metrics. For instance, a user may specify that a geographical proximity metric should be given additional emphasis in determining an optimal data center 110 for fulfilling the request. In such an example, the placement system 120 may adjust the weight associated with the normalized geographical proximity metric in calculating the weighted average. Of course, such an example is without limitation and is for illustrative purposes only, and more generally, any technique for calculating a suitability value consistent with the functions described herein may be used instead.

FIG. 1B illustrates a system for fulfilling cloud resource requests, according to one embodiment of the present invention. As shown, the system 115 includes a placement system 120 and a client system 180, communicatively connected via the network 175. The placement system 120 includes a computer processor 125, storage 130, I/O devices 140, system memory 145 and a network interface 170. Computer processor 122 may be any processor capable of performing the functions described herein. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN). The placement system 120 may connect to the network 175 using the network interface 170. Furthermore, as will be understood by one of ordinary skill in the art, any computer system capable of performing the functions described herein may be used.

Illustratively, memory 145 contains a service placement component 150, data center data 155 and an operating system 165. Although memory 145 is shown as a single entity, memory 145 may include one or more memory devices having blocks of memory associated with physical addresses, such as random access memory (RAM), read only memory (ROM), flash memory or other types of volatile and/or non-volatile memory. Generally, the data center data 155 includes data and metadata about one or more data centers providing computing resources to the cloud. For instance, the data center data 155 may include a listing of physical resources at each data center, a listing of available resources at each data center, network performance metrics for each data center, a geographic location of each data center, and so on. The operating system 132 may be any operating system capable of performing the functions described herein.

The service placement component 150 generally receives requests from the client system 180 (e.g., via the network 175) and calculates a suitability value for each of the received requests. Additionally, the service placement component 150 may also apply one or more policy-based constraints to the list of identified data centers. For instance, the service placement component 150 may have a policy constraint specifying that new cloud services should not be placed at a data center that is consuming more than 80% of its available network resources or available power budget. In such an example, even if a particular data center would score highly on all of the metric calculations, the service placement component 150 may exclude the data center from consideration for fulfilling the request if the data center is currently consuming 90% of its available network resources. By doing this, the service placement component 150 may effectively balance the load between the data centers, while still selecting an optimal data center for placing the new cloud services specified by the request.

In one embodiment, upon receiving the request, the service placement component 150 calculates the suitability value by first identifying a plurality of data centers available for processing the request (e.g., the data centers 110 shown in FIG. 1A). For each identified data center, the service placement component 150 may then calculate a plurality of metrics based on the request. For instance, the service placement component 150 may calculate both a geographic proximity and a logical (or network) proximity between each data center and the client system 180. In one embodiment, the request may further specify a location from which such metrics should be calculated. As an example, if a user is submitting a request for a virtualized data center to be used from the user's corporate headquarters, the request may specify the location of the corporate headquarters for use in identifying an optimal data center for instantiating the request.

Additionally, the service placement component 150 may calculate one or more metrics associated with the performance of the network between each data center and the client location. For instance, such metrics may include measurements of latency, jitter, packet loss rate, available bandwidth, and so on. The service placement component 150 may also determine an availability of required network resources and capabilities for each data center. As a first example of a network resource, the service placement component 150 may determine whether resources such as virtual local area networks ("VLANs"), virtual forwarding and routing capabilities ("VRFs"), traffic shaping capabilities, traffic policing capabilities, security rules, and so on are available for a given data center. As a second example of network capabilities, the service placement component 150 may determine whether a given data center includes capabilities such as a load balancer, firewalls, L2 and/or L3 VPN terminations, SSL termination, and so on.

Once all the relevant metrics are calculated for each data center, the service placement component 150 may then normalize the metrics so that a single suitability value may be determined from the plurality of metrics. In one embodiment of the invention, the user may specify a cost model for one or more metrics in the request. Such cost models are described in more detail below in the discussion of FIGS. 6A and 6B. Upon normalizing the metrics, the service placement component 150 may then calculate a suitability value for each data center, using the normalized metrics associated with each of the data centers. For instance, the service placement component 150 may calculate the suitability value using a weighted average of the normalized metrics. Additionally, in one embodiment, the user may specify (e.g., in the request) that a preference should be given in selecting a data center for particular metrics. As an example, the user may specify that, for a given request, the network performance metrics should be treated as more important, while the network proximity and geographical proximity metrics should be treated as less important. In such an example, the service placement component 150 may adjust the weights of each of the metrics accordingly in calculating the weighted average.

The service placement component 150 may then select a particular data center for placing the new cloud services specified in the request, based on the calculated suitability values. Once the particular data center is selected, the service placement component 150 may transmit the request to the selected data center to be fulfilled. Advantageously, by doing this, embodiments of the invention may intelligently select an optimal data center for placing new cloud services, and may do so in a way that takes account of a user's preferences, (e.g., in normalizing the values of the metrics and in calculating the weighted average).

Figure 2:
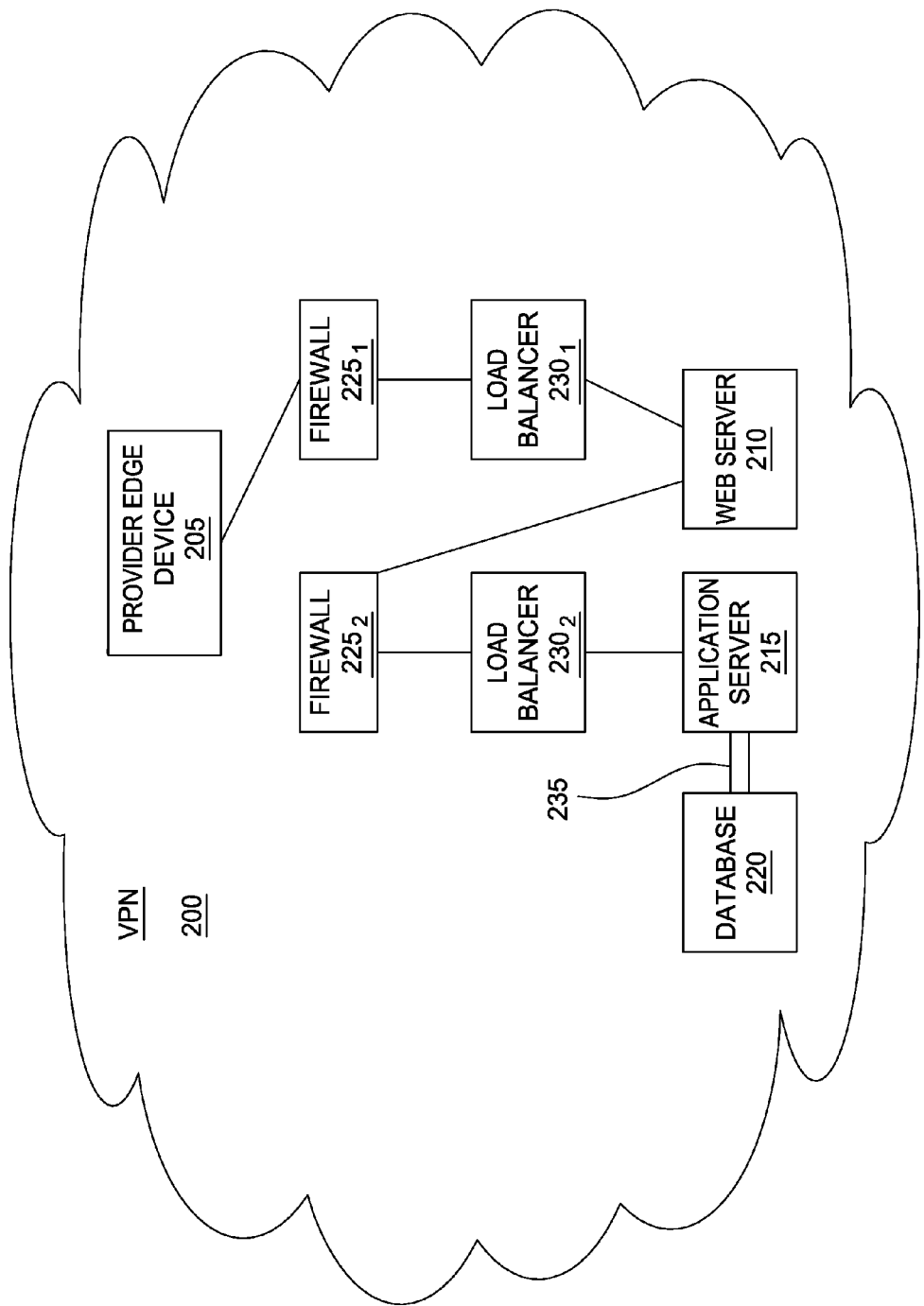
FIG. 2 illustrates a topology of a virtual data center, according to one embodiment of the present invention.

FIG. 2 illustrates a topology of a virtual data center, according to one embodiment of the present invention. In the context of the present disclosure and for the purposes of this example, assume that the topology shown in FIG. 2 describes a virtualized data center to be instantiated in a cloud (e.g., as may be specified in a request submitted to the service placement component 150). As shown, FIG. 2 includes a virtual private network 200 ("VPN"). The VPN 200 includes a provider edge device 205 connected to a web server 210, with the connection between the two including a firewall $225_1$ and a load balancer $230_1$. The web server 210, in turn, is connected to the application server 215, with the connection between the two also including a firewall $225_2$ and a load balancer $230_2$. The application server 215 is connected to a database 220 using the connection 235. Here, the double lines used to show the connection 235 indicate that the connection 235 should be of a high quality of service (e.g., a dedicated or low-traffic connection).

In the context of the present disclosure, the service placement component 150 may receive a request specifying the topology for a virtualized data center shown in FIG. 2. As discussed above, the service placement component 150 may then calculate one or more metrics for each data center based on the request. As an example, since the VPN 200 includes firewalls 225 and load balancers 230, the service placement component 150 may determine the availability of firewall and load balancer network capabilities at each data center. Continuing the example, if load balancer capabilities are not available at a particular data center, the service placement component 150 may determine that the request should not be submitted to the particular data center for fulfillment. As a second example, since the topology further specifies the connection 235 should have a high quality of service, the service placement component 150 may consider for each data center whether the data center has such a connection available. In such an example, if a first data center is able to provide a dedicated connection for the connection 235, while a second data center can only provide a connection with a medium amount of existing traffic on it for the connection 235, the service placement component 150 may assign a better metric score to the first data center. Of course, such examples are without limitation and for illustrative purposes only, and one of ordinary skill in the art will recognize that any number of other factors and other metrics may be considered in addition to or instead of the above examples.

Figure 3:
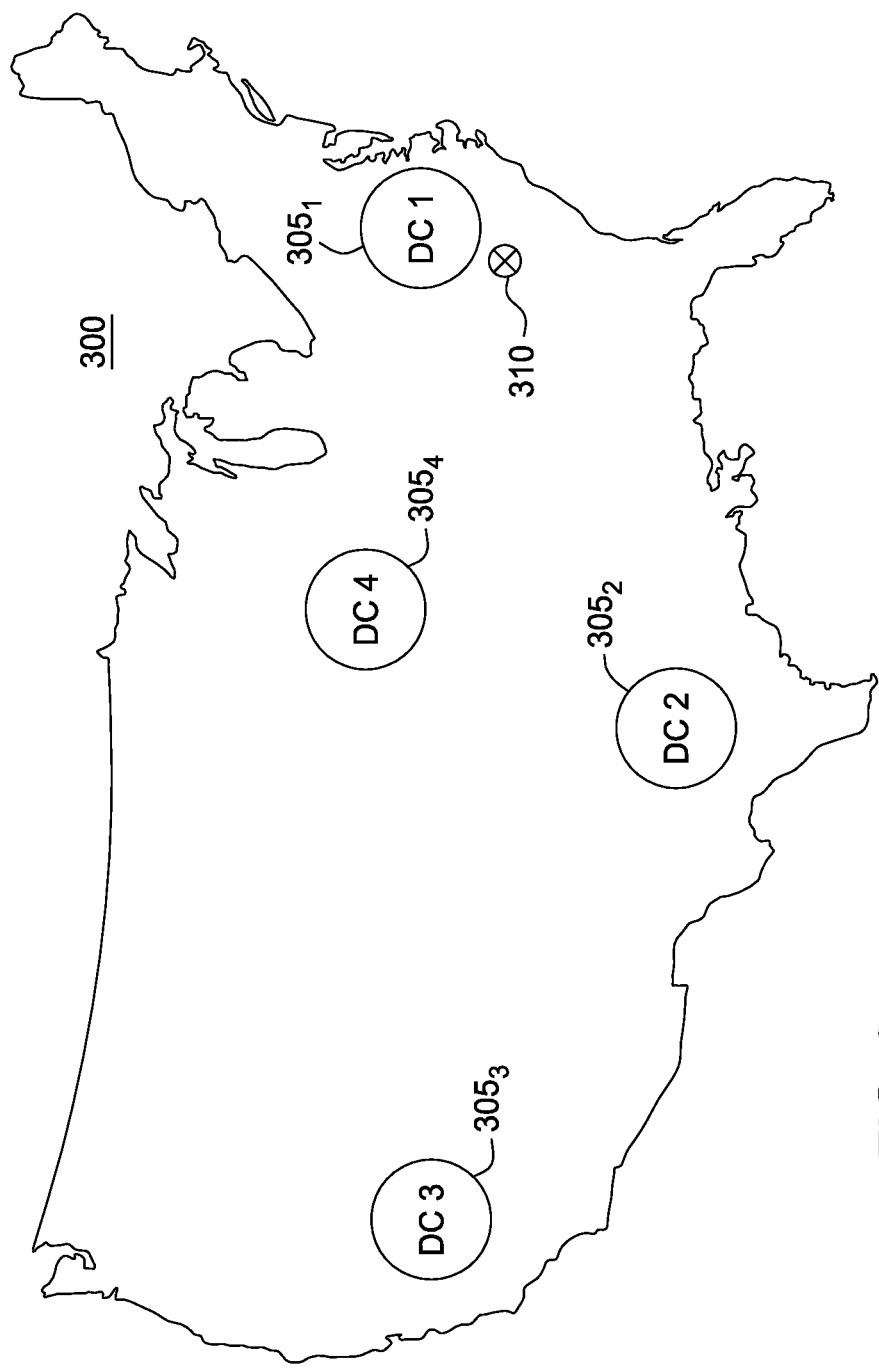
FIG. 3 illustrates the locations of a plurality of data centers, according to one embodiment of the present invention.

FIG. 3 illustrates the locations of a plurality of data centers, according to one embodiment of the present invention. As shown, the map 300 includes the locations of four data centers 305 and the location of a client site 310. For the purposes of this example, assume that the client site 310 refers to the location of a client from which a request for cloud services was received. In such a scenario, upon receiving the request, the service placement component 150 may calculate metrics such as the geographical distance between the client site 310 and each of the data centers 305. Thus, as shown, such a metric would indicate that the data center DC1 $305_1$ is physically closer to the client site 310 than the data center DC3 $305_3$. Such a metric may be useful, for example, in estimating an average latency of network traffic between the client site 310 and the data centers 305.

Additionally, the service placement component 150 may consider a network proximity between the client site 310 and each of the data centers 305. Thus, although the data center DC4 $305_4$ may be physically closer to the client site 310 than the data center DC2 $305_2$, the data center DC4 $305_4$ may be 14 hops away from the client site 310; whereas the data center DC2 $305_2$ is only 11 hops away from the client site. The service placement component 150 may also consider the performance of the network between the data centers 305 and the client site 310. For instance, if the service placement component 150 determines that the connection between the data center DC1 $305_1$ and the client site has an increased rate of packet loss, the service placement component 150 may assign a low (i.e., unfavorable) network performance metric for the data center DC1 $305_1$. As discussed above, other examples of network performance metrics include, without limitation, latency, jitter, amount of bandwidth available, and so on.

Figure 4:
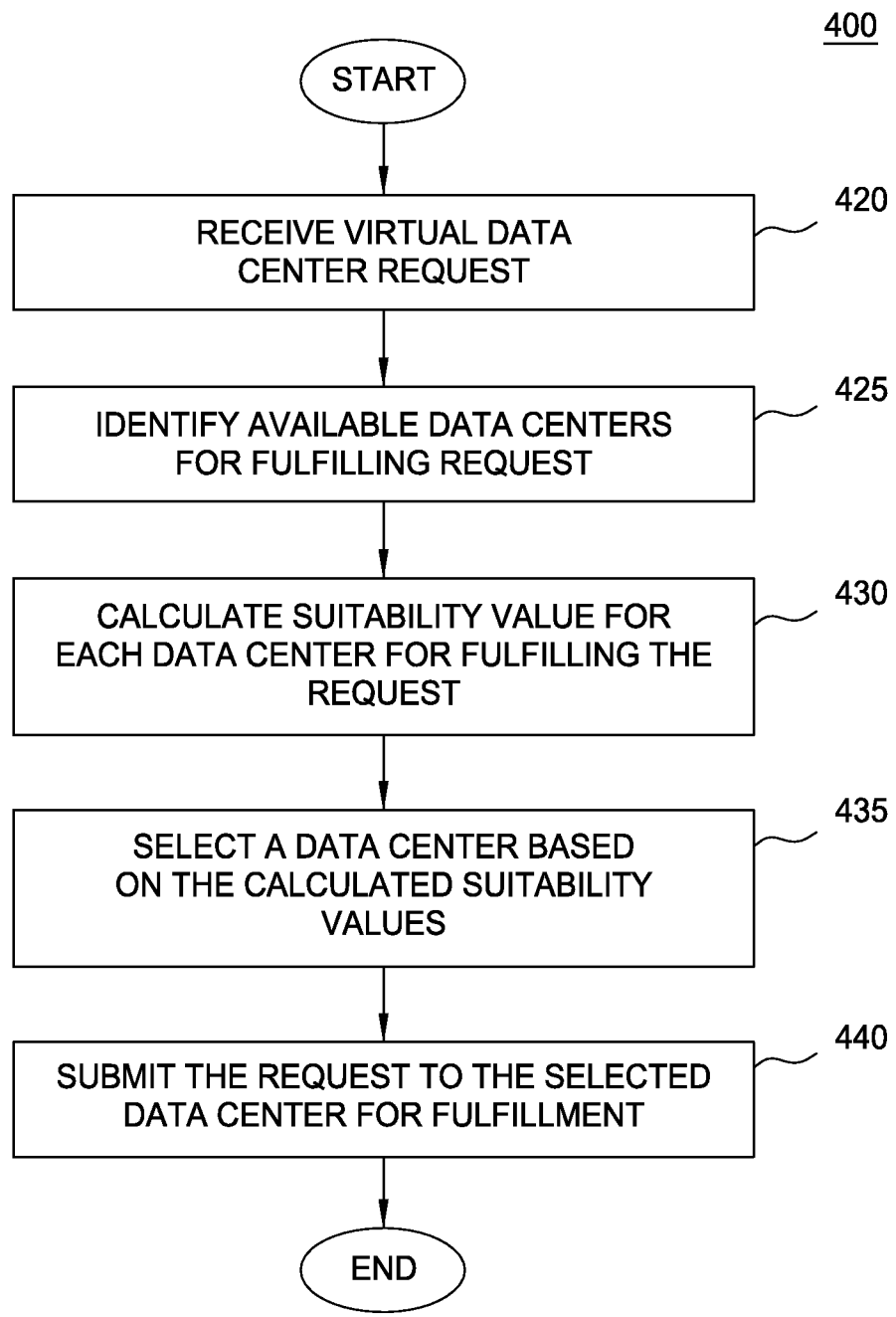
FIG. 4 illustrates a method for selecting a data center for fulfilling a resource request, according to one embodiment of the present invention.

FIG. 4 illustrates a method for selecting a data center for fulfilling a resource request, according to one embodiment of the present invention. As shown, the method 400 begins at step 420, where the service placement component 150 receives a virtual data center request from a user (step 420). As discussed above, such a request specifies a topology of a new cloud service to be instantiated in the cloud (e.g., the topology shown in FIG. 2 and discussed above). Upon receiving the request, the service placement component 150 identifies a plurality of available data centers for fulfilling the request (step 425). Such data centers may be located in any number of different geographic locations. Furthermore, each data center may provide a different set of computing resources to the cloud, and may have a different workload and set of currently available resources.

The service placement component 150 then calculates a suitability value for each of the identified data centers (step 430). Generally, the suitability value reflects a fitness of a data center for instantiating a particular cloud service specified in a request. For example, the suitability value may reflect factors such as geographic proximity between the data center and a client site from which the cloud service will be used, or a network proximity between the data center and the client site (e.g., a number of hops between the two). Additionally, the suitability value may be indicative of the performance of the network between the data center and the client site. Such network performance may be based on, for example, measurements of latency on the network connection, packet loss rate on the connection and bandwidth of the connection.

Once service placement component 150 calculates a suitability value for each of the identified data centers, the service placement component 150 selects a data center for use in fulfilling the request based upon the calculated suitability values (step 435). That is, because the suitability value reflects the fitness of a data center for instantiating the new cloud services specified in the request, the service placement component 150 selects the data center determined to be the best fit for instantiating the new cloud service. The service placement component 150 then submits the request to the selected data center to be fulfilled (step 440), and the method 400 ends.

One advantage to the method 400 is that it intelligently selects an optimal data center for instantiating the new cloud service. While currently a user may manually choose a geographic location where a cloud service should be instantiated, such a technique fails to consider the particular suitability for each data center providing resources to the cloud. Thus, while the user may choose the geographically closest data center, such a data center may not always be the optimal choice (e.g., if the network performance for the connection to that data center frequently experiences packet loss). Advantageously, by evaluating the fitness of each data center specifically for instantiating the new cloud service, the method 400 enables the optimal data center to be selected. This, in turn, may improve the performance of the new cloud service once it is instantiated in the cloud.

Figure 5:
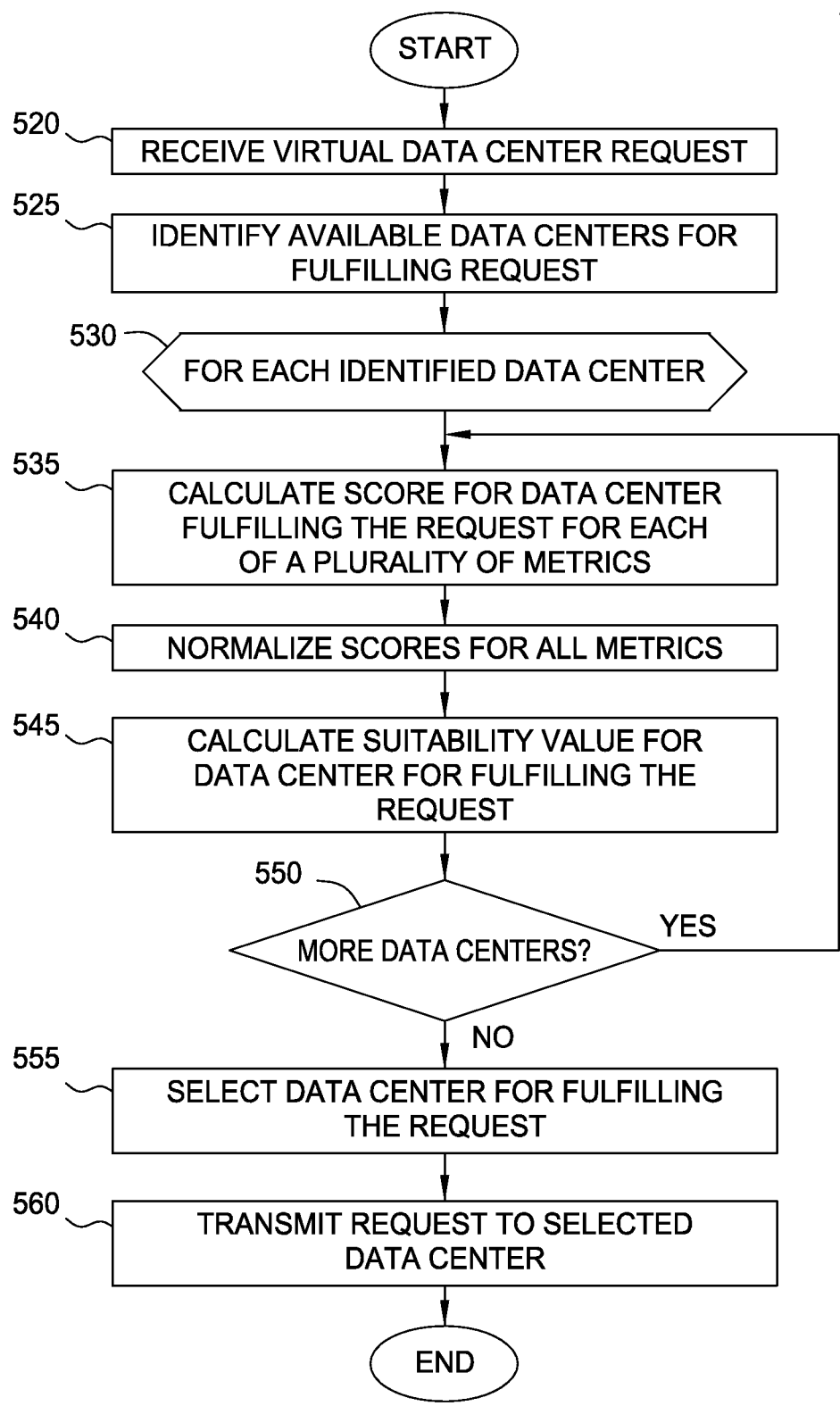
FIG. 5 illustrates a method for selecting a data center for fulfilling a resource request, according to one embodiment of the present invention.

FIG. 5 illustrates a method for selecting a data center for fulfilling a resource request, according to one embodiment of the present invention. As shown, the method 500 begins at step 520, where the service placement component 150 receives a virtual data center request from a user. Upon receiving the request, the service placement component 150 identifies a plurality of available data centers which provide computing resources to the cloud and which may be used in fulfilling the request (step 525).

The method 500 then enters a loop from steps 530-550, where for each identified data center, the service placement component 150 calculates a score for the data center for each of a plurality of metrics (step 535). Table 1 below illustrates example calculations for three data centers.

TABLE 1

Example of Data Center Metric Calculations

| | Network Proximity | Geo- graphical Proximity | Network Perfor- mance | Capability to Instantiate VDC | Resource Availability |
|---|---|---|---|---|---|
| Data Center A | 200 | 10000 | 80 | 5 | 80% |
| Data Center B | 120 | 2500 | 44 | 3 | 68% |
| Data Center C | 700 | 1750 | 140 | 1 | 22% |

Thus, in the example depicted by Table 1, five metrics were evaluated for each of three different data centers. Of note, although Table 1 does not include units for the calculated metrics since the units may vary based on the implementation, it is broadly contemplated that any unit of measurement may be used for calculating the metric values. This is so because, as long as the metrics are calculated across the data centers using the consistent units of measurements for a given metric, the service placement component 150 may determine how well each data center compares against the other data centers for the given metric.

Once the service placement component 150 calculates a score for each of the plurality of metrics, the service placement component 150 normalizes all the scores to create a plurality of normalized metrics (step 540). In one embodiment of the invention, the service placement component 150 normalizes the scores using a normalized cost function. Such a normalized cost function is discussed in more detail below in the discussion surrounding FIGS. 6A-6B. More generally, however, the service placement component 150 normalizes the metric values into a consistent unit of measurement, so that a single suitability value may be calculated using the various types of metrics. For example, as shown in Table 1, a single suitability value cannot easily be calculated using the metrics for Data Center A, because the metrics are measured with different units of measurement (e.g., 80% resource availability and 10000 geographical proximity). By normalizing these values into a common unit of measurement, a single suitability value may be calculated (e.g., by averaging the normalized values).

Once the scores are normalized, the service placement component 150 calculates a suitability value for the data center, based on the normalized metrics (step 545). As discussed above, in one embodiment, the service placement component 150 determines the suitability value by calculating an average of all the normalized metrics for a given data center. Additionally, such an average may be a weighted average calculation, where each normalized metric value is associated with a respective weight. For instance, if the user indicates (e.g., in the request) that the geographical proximity metric should be given more importance than the other metrics, the service placement component 150 may adjust the weight associated with the normalized geographical proximity metric accordingly.

The service placement component 150 then determines whether there are more data centers to calculate suitability values for (step 550). If the service placement component 150 determines there are more data centers, the loop reverts to step 535, where the service placement component 150 calculates a score for the next data center for each of a plurality of metrics. If instead the service placement component 150 determines there are no more data centers to consider, the service placement component 150 then selects a single data center to fulfill the request based on the calculated suitability values (step 555). Once the data center is selected, the service placement component 150 transmits the request to the selected data center to be fulfilled, and the method 500 ends.

Figure 6A:
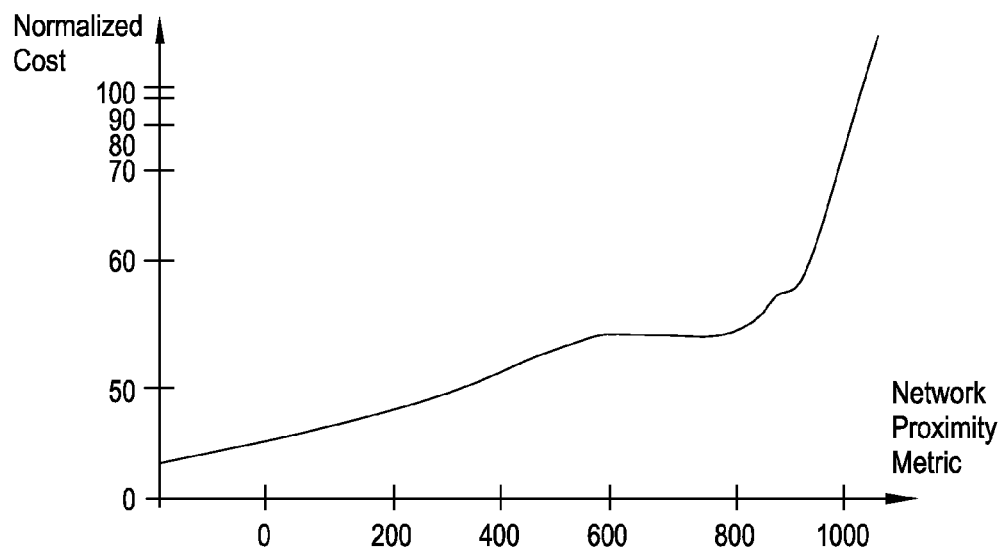
FIGS. 6A-6B illustrate graphs of normalized cost for a network proximity metric, according to embodiments of the present invention.
Figure 6B:
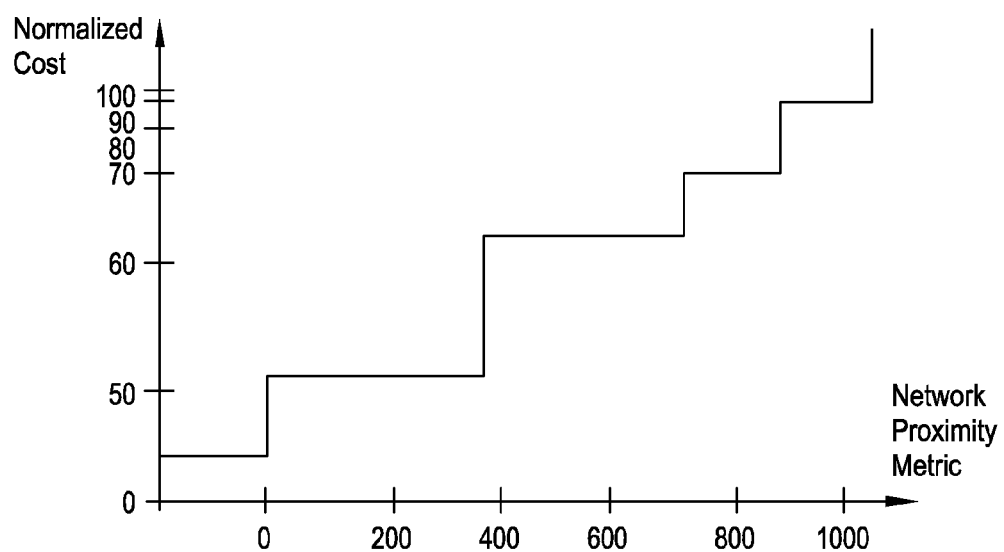

FIGS. 6A-6B illustrate graphs of normalized cost for a network proximity metric, according to embodiments of the present invention. As discussed above, in certain embodiments, a user may specify a cost function to be used in normalizing particular metrics associated with a request. FIG. 6A illustrates an example of such a cost function for a network proximity metric. As shown, the graph 600 indicates that the normalized cost begins at 25 at the network proximity score of 0, and then gradually increases with the network proximity score until a network proximity score of 800 is reached. At this point, the normalized cost rapidly increases, reaching a maximum normalized cost of 100 at approximately a network proximity score of 1000. As such, the graph 600 indicates that a preference is given to network proximity scores in the 800+ range, with much higher normalized costs being given to these values, while the differences between lower network proximity scores (e.g., between the scores of 400 and 500) is less dramatic.

FIG. 6B illustrates a second normalized cost function for the network proximity metric. Here, the graph 650 shows that the normalized cost is assigned based on various ranges of the network proximity metric. Thus, for example, all scores in the range of 0 to 400 network proximity score are assigned the normalized cost of approximately 50. As such, the cost model shown in the graph 650 indicates that the user has identified various ranges of network proximity scores, and that network proximity scores within each of the ranges are treated equally. Of course, the example cost functions depicted in FIGS. 6A and 6B are for illustrative purposes only and are without limitation. Moreover, one of ordinary skill in the art will recognize that more generally any cost function may be used in calculating the normalized cost for any of the calculated metrics.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving a request specifying selection preferences and a topology describing a first cloud service to be hosted by one of a plurality of data centers which provide computing resources for hosting a plurality of cloud services, wherein the topology specifies an organization and interconnectivity of a plurality of components that make up the first cloud service and includes one or more resource requirements that specify a minimum requirement of computing resources used to fulfill the request, and wherein the selection preferences specify how to evaluate each of a plurality of metrics to assess a fitness of a data center for hosting the first cloud service;
for each data center in the plurality of data centers that satisfies the one or more resource requirements, determining a suitability value which describes a fitness of the respective data center for hosting the first cloud service having the specified topology, comprising:
calculating a value for each of the plurality of metrics for the data center, based on the selection preferences specified in the request; and
determining the suitability value for the data center, based on the calculated values for the plurality of metrics; and
selecting a data center to fulfill the request, based at least in part on the determined suitability values.

2. The method of claim 1, wherein determining a suitability value further comprises:
normalizing each of the calculated values for the plurality of metrics to produce a plurality of normalized values, wherein the suitability value is determined by taking a weighted average of the values in the plurality of normalized values.

3. The method of claim 1, wherein the received request specifies a client site, and wherein the plurality of metrics includes one or more of a physical proximity metric indicative of a geographic distance between the data center and the client site, and a network proximity metric indicative of a network distance between the data center and the client site.

4. The method of claim 1, wherein the received request specifies a client site, and wherein the plurality of metrics includes at least one measurement of network performance for a network connection between the data center and the client site.

5. The method of claim 1, wherein the plurality of metrics includes a measurement of an availability of one or more components included in the topology of the new cloud service at the data center.

6. The method of claim 1, wherein the plurality of metrics includes a workload metric indicating the current workload of the data center.

7. The method of claim 1, wherein the received request further contains one or more policy constraints each including a conditional expression identifying a set of data centers, and wherein selecting one of the data centers to fulfill the request is further based on the one or more policy constraints.

8. The method of claim 1, wherein the selection preferences include a user-specified cost model corresponding to at least one of the plurality of metrics.

9. A system, comprising:
a processor; and
a memory to store executable code, which, when executed on the processor, performs an operation, comprising:
receiving a request specifying selection preferences and a topology describing a first cloud service to be hosted by one of a plurality of data centers which provide computing resources for hosting a plurality of cloud services, wherein the topology specifies an organization and interconnectivity of a plurality of components that make up the first cloud service and includes one or more resource requirements that specify a minimum requirement of computing resources used to fulfill the request, and wherein the selection preferences specify how to evaluate each of a plurality of metrics to assess a fitness of a data center for hosting the first cloud service;
for each data center in the plurality of data centers that satisfies the one or more resource requirements, determining a suitability value which describes a fitness of the respective data center for hosting the first cloud service having the specified topology, comprising:
calculating a value for each of the plurality of metrics for the data center, based on the selection preferences specified in the request; and
determining the suitability value for the data center, based on the calculated values for the plurality of metrics; and
selecting a data center to fulfill the request, based at least in part on the determined suitability values.

10. The system of claim 9, wherein determining a suitability value further comprises:
normalizing each of the calculated values for the plurality of metrics to produce a plurality of normalized values, wherein the suitability value is determined by taking a weighted average of the values in the plurality of normalized values.

11. The system of claim 9, wherein the received request specifies a client site, and wherein the plurality of metrics includes one or more of a physical proximity metric indicative of a geographic distance between the data center and the client site, and a network proximity metric indicative of a network distance between the data center and the client site.

12. The system of claim 9, wherein the received request specifies a client site, and wherein the plurality of metrics includes at least one measurement of network performance for a network connection between the data center and the client site.

13. The system of claim 9, wherein the plurality of metrics includes a measurement of an availability of one or more components included in the topology of the new cloud service at the data center.

14. The system of claim 9, wherein the plurality of metrics includes a workload metric indicating the current workload of the data center.

15. The system of claim 9, wherein the received request further contains one or more policy constraints each including a conditional expression identifying a set of data centers, and wherein selecting one of the data centers to fulfill the request is further based on the one or more policy constraints.

16. The system of claim 9, wherein the selection preferences include a user-specified cost model corresponding to at least one of the plurality of metrics.

17. A computer program product, comprising:
   a non-transitory computer readable medium that stores a computer code, the computer code configured to:
   receive a request specifying selection preferences and a topology for a first cloud service to be hosted by one of a plurality of data centers which provide computing resources for hosting a plurality of cloud services, wherein the topology specifies an organization and interconnectivity of a plurality of components that make up the first cloud service and includes one or more resource requirements that specify a minimum requirement of computing resources used to fulfill the request, and wherein the selection preferences specify how to evaluate each of a plurality of metrics to assess a fitness of a data center for hosting the first cloud service;
   for each data center in the plurality of data centers that satisfies the one or more resource requirements, determine a suitability value which describes a fitness of the respective data center for hosting the first cloud service having the specified topology, comprising:
      calculating a value for each of the plurality of metrics for the data center, based on the selection preferences specified in the request; and
      determining the suitability value for the data center, based on the calculated values for the plurality of metrics; and
   select a data center to fulfill the request, based at least in part on the determined suitability values.

18. The computer program product of claim 17, wherein the selection preferences include a user-specified cost model corresponding to at least one of the plurality of metrics.

* * * * *